United States Patent
Golgiri et al.

(10) Patent No.: US 11,027,699 B2
(45) Date of Patent: Jun. 8, 2021

(54) BACKUP KEY WITH WIRELESS CAPABILITIES

(71) Applicant: FORD GLOBAL TECHNOLOGIES, LLC, Dearborn, MI (US)

(72) Inventors: Hamid M. Golgiri, Livonia, MI (US); Aaron Matthew DeLong, Toledo, OH (US); Anthony Melatti, Dearborn, MI (US); Patrick Lawrence Jackson Van Hoecke, Livonia, MI (US); Danielle Rosenblatt, Dearborn, MI (US); John Van Wiemeersch, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 39 days.

(21) Appl. No.: 16/570,287

(22) Filed: Sep. 13, 2019

(65) Prior Publication Data

US 2021/0078532 A1 Mar. 18, 2021

(51) Int. Cl.
*B60R 25/24* (2013.01)
*B60R 25/22* (2013.01)

(52) U.S. Cl.
CPC .............. *B60R 25/24* (2013.01); *B60R 25/22* (2013.01); *B60R 2325/101* (2013.01); *B60R 2325/103* (2013.01)

(58) Field of Classification Search
CPC ... B60R 25/24; B60R 25/22; B60R 2325/103; B60R 2325/101; E05B 19/0082; E05B 19/04; E05B 19/14; E05B 19/18
See application file for complete search history.

(56) References Cited

U.S. PATENT DOCUMENTS

| | | | |
|---|---|---|---|
| 1,662,613 A | * | 3/1928 | Laynor .................... E05B 19/18 70/395 |
| 4,429,554 A | * | 2/1984 | Litvin .................. E05B 19/0035 70/358 |
| 7,690,233 B2 | | 4/2010 | Katagiri et al. |
| 7,956,741 B2 | | 6/2011 | Tamezane et al. |

(Continued)

FOREIGN PATENT DOCUMENTS

WO 2007065723 A1 6/2007

OTHER PUBLICATIONS

Renault Captur's Smart Access Card—What is it?, Daily Post e-Paper, Nov. 1, 2017, retrieved from http://dailypost.in/news/automobiles/renault-capturs-smart-access-card/ on Apr. 30, 2019.

*Primary Examiner* — Nabil H Syed
(74) *Attorney, Agent, or Firm* — Frank L. Lollo; Brooks Kushman P.C.

(57) ABSTRACT

A keycard may include electronics to allow access to vehicle functions. A keycard system for a vehicle includes a plurality of sections of a stacking key, and a keycard, including a key holder defining a plurality of sleeves, each sleeve having an opening for receiving a respective one of the plurality of sections, wherein the key holder further includes electronics configured to wirelessly provide access to the vehicle. A foldable keycard includes hinged sections, each defining a base and a layer of a blade of a key extending therefrom; and an electronic vehicle access component arranged at the base of one of the sections opposite the blades, and configured to fold away from the blades to allow the keycard to be inserted into a lock.

9 Claims, 4 Drawing Sheets

(56) References Cited

U.S. PATENT DOCUMENTS

| | | |
|---|---|---|
| 8,798,809 B2 | 8/2014 | Kalhous et al. |
| 9,460,571 B2 | 10/2016 | Kleve et al. |
| 9,696,691 B2 | 7/2017 | Menard et al. |
| 10,137,861 B2 | 11/2018 | Park et al. |
| 2003/0222755 A1 | 12/2003 | Kemper et al. |
| 2007/0006622 A1* | 1/2007 | Luo ..................... A45C 11/324 70/456 R |
| 2007/0214851 A1* | 9/2007 | Yamaguchi ........ G07C 9/00944 70/396 |
| 2013/0154794 A1* | 6/2013 | Menard ................... G05B 1/01 340/5.61 |
| 2014/0375423 A1 | 12/2014 | Lagabe |
| 2016/0110938 A1* | 4/2016 | Kleve .................... A45C 11/00 340/5.61 |
| 2017/0234034 A1* | 8/2017 | Borenstein ......... E05B 47/0045 70/408 |
| 2017/0268255 A1* | 9/2017 | Zhang .................... E05B 19/18 |
| 2017/0338848 A1* | 11/2017 | Sharma ................... H04B 1/16 |
| 2019/0122464 A1 | 4/2019 | DeLong et al. |

\* cited by examiner

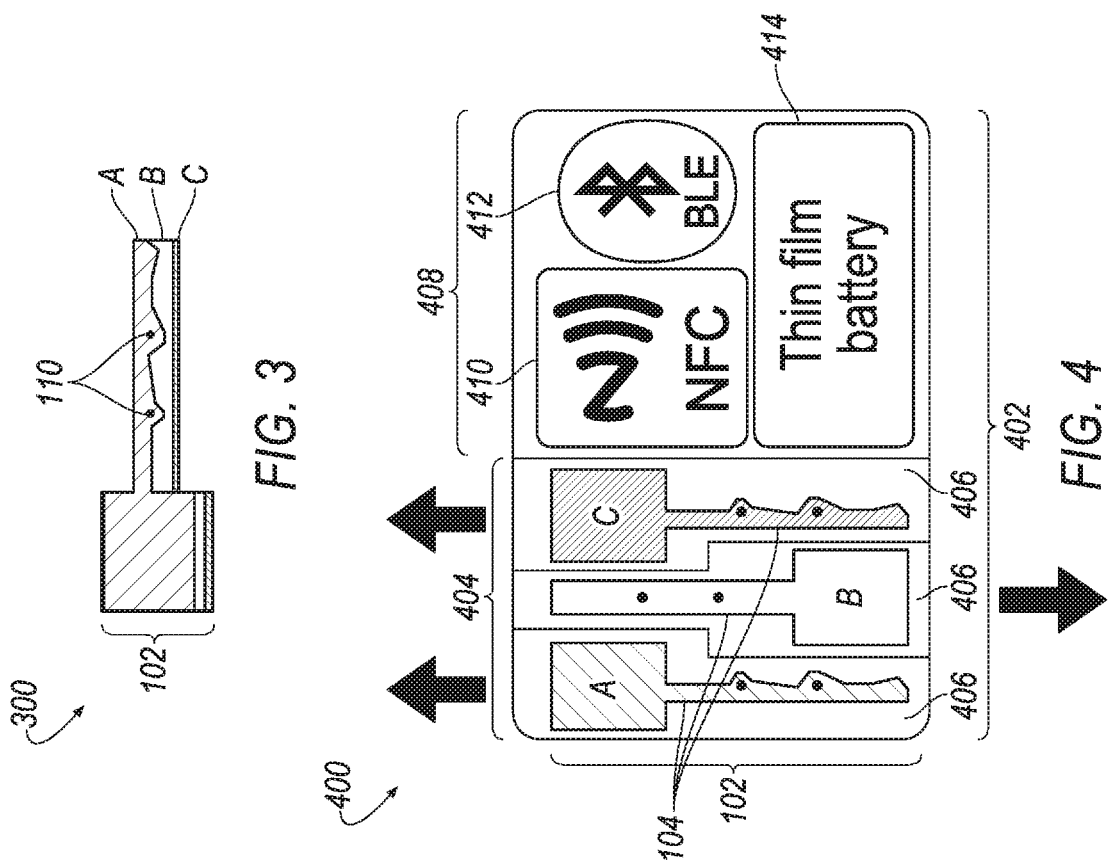
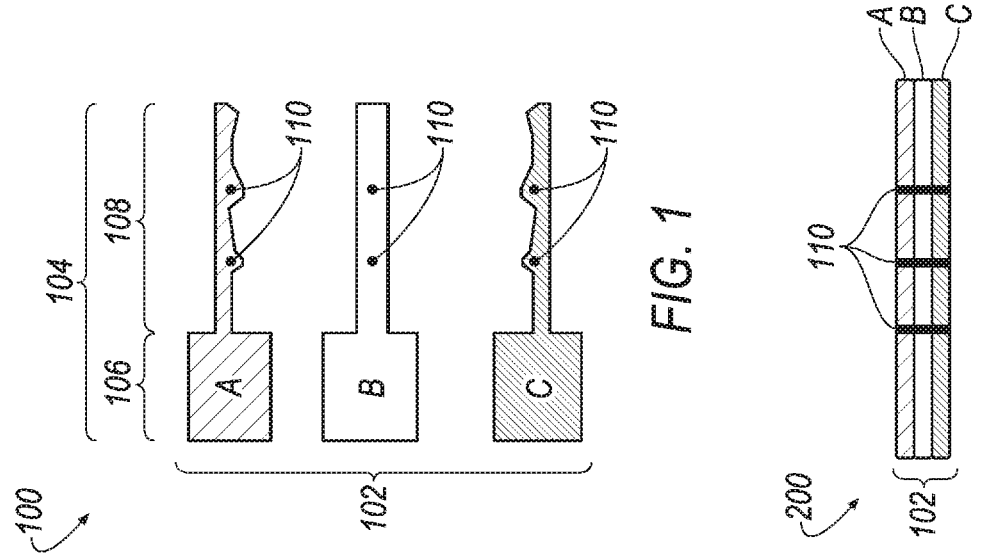

BACKUP KEY WITH WIRELESS CAPABILITIES

TECHNICAL FIELD

Aspects of the disclosure generally relate to a backup key having wireless capabilities, which may be used as a backup for access to vehicles.

BACKGROUND

When a battery of a locked vehicle falls below a certain state of charge, electronic unlocking systems may not operate, in which case the user of the vehicle may use a mechanical key to unlock and open the door, and then pull the hood release or other release, depending on the location of the battery. Opening the secured battery compartment is a step to getting the vehicle mobile again, since this may be the only way to jump-start the vehicle or replace the battery.

For vehicles with Passive-Entry/Passive-Start (PEPS) fobs, the user does not use a mechanical key under normal operation. However, within the key fob is a mechanical backup key, in case of a failure of the PEPS system (depleted fob battery, depleted car battery, etc.).

Some vehicles are now equipped with a Phone-as-a-Key (PaaK) feature, where the vehicle is normally unlocked or locked via the user's smartphone. The vehicle may be sold with a PEPS fob containing the standard mechanical backup key, but a typical PaaK user may not carry a backup key. This means that, in the event of a locked vehicle with a poor battery state of charge, there may be no direct means of opening the secured battery compartment (e.g., to jump-start the vehicle or replace the battery).

In this scenario, the user may be forced to call a locksmith or roadside assistance (assuming lock-picking and jump-starting capabilities), or a roommate or other person who is able to retrieve the PEPS fob containing the mechanical backup key. While awaiting assistance, the user may be in an undesirable outside environment, such as in the cold or rain, or on a busy roadway.

SUMMARY

In a first illustrative example, a keycard system for a vehicle includes a plurality of sections of a stacking key, each section defining a base and a layer of a blade of a key, the base being wider than the blade, the plurality of sections being stackable on top of one another to cause the layers of the blade to align to form the key; and a keycard, including a key holder defining a plurality of sleeves, each sleeve having an opening for receiving a respective one of the plurality of sections, the openings of the sleeves alternating in direction to allow the bases of the respective key sections to fit without overlapping, wherein the key holder further includes vehicle access electronics configured to wirelessly provide access to the vehicle.

In a second illustrative example, a foldable keycard includes first and second sections, each defining a base and a layer of a blade of a key extending therefrom; a hinge connecting the bases of the first and second sections, wherein the first section is configured to fold over the second section about the hinge so that a top surface of the first section is against a bottom surface of the second section and each of the layers of the blades align to form the blade of the key, and the first and second sections are configured to fold about the hinge into a storage position to form a collective flat surface; and an electronic vehicle access component arranged at the base of one of the sections opposite the blades, and configured to fold away from the blades to allow the keycard to be inserted into a lock.

In a third illustrative example, a keycard includes a key holder defining a plurality of sleeves, each sleeve having an opening for receiving a respective one of a plurality of sections of a stackable key, the openings of the sleeves alternating in direction to allow bases of the respective key sections to fit without overlapping; and vehicle access electronics configured to wirelessly provide access to the vehicle.

BRIEF DESCRIPTION OF THE DRAWINGS

FIG. 1 illustrates an example of a stackable key including a plurality of stackable key sections;

FIG. 2 illustrates an example side view of the plurality of stackable key sections of the stackable key of FIG. 1 arranged in a stacked state;

FIG. 3 illustrates an example top view of the plurality of stackable key sections of the stackable key of FIG. 1 arranged in the stacked state;

FIG. 4 illustrates an example of a keycard having a key holder for the storage of the key sections of the stackable key and a vehicle access electronics section for the storage of electronics configured to wirelessly provide access to a vehicle;

DETAILED DESCRIPTION

Figure 5:
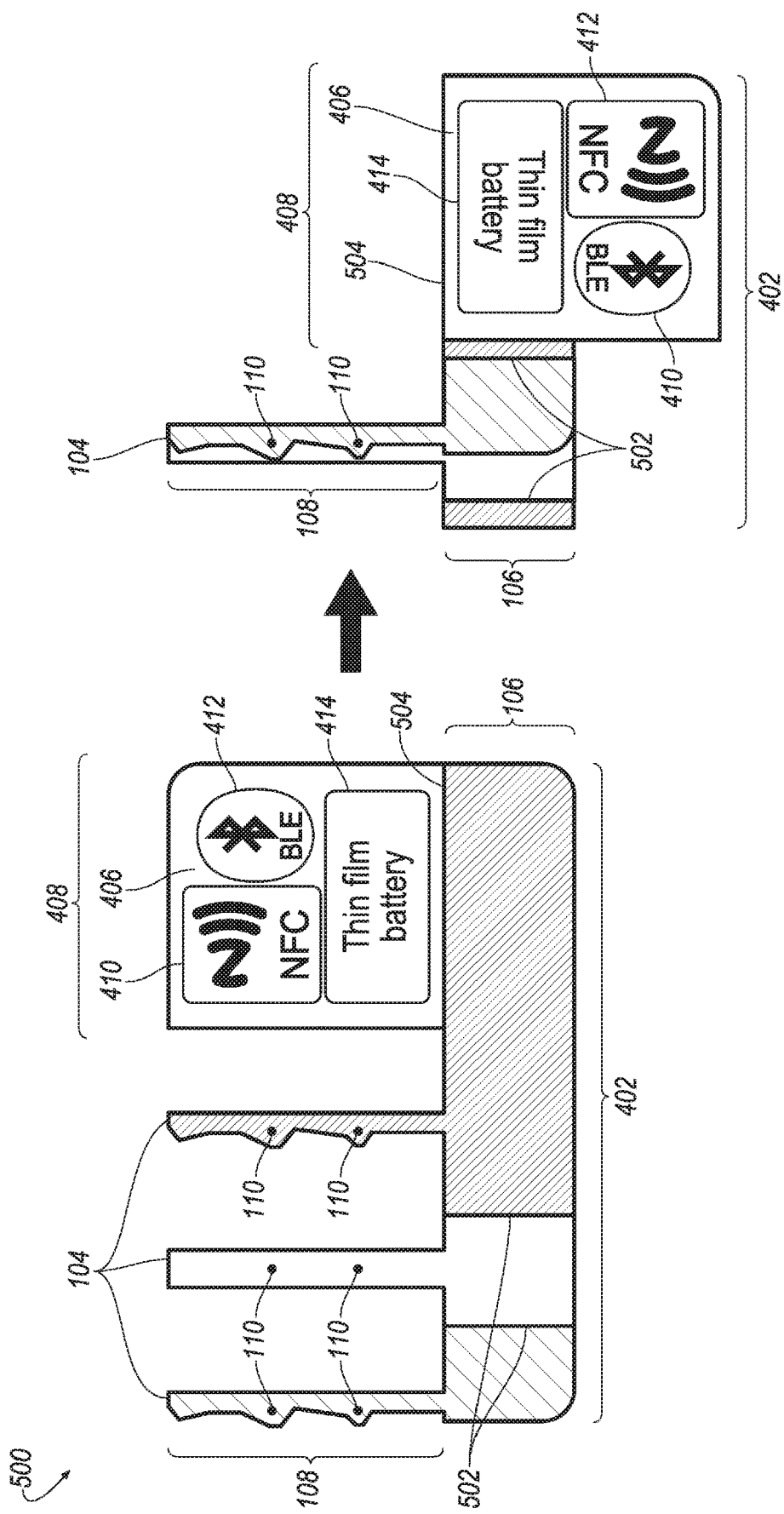
FIG. 5 illustrates an example of a keycard that is foldable into a backup key and that includes a vehicle access electronics section for the storage of electronics configured to wirelessly provide access to the vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Plastic break-away wallet keycards may be manufactured as a thick card with a mostly-cutaway key that can be broken out and used. However, such keycards may be too thick to comfortably be placed in a wallet. For example, such keys may be on the order of two to three millimeters thick, compared to the ISO standard thickness for credit cards of 0.76 millimeters. Additionally, once the user breaks the spare key away from the card carrier, the key is now loose and lacks an easy way to be stored. In effect, before the first use the keycard is convenient to store but after the first use the break-away key is no more convenient than a regular metal non-RFID blade with the proper cut. Metal backup keys are also about 3 millimeters thick (the same thickness as a normal key). This is also generally too thick for wallet storage.

It may be desirable to offer a credit-card-sized backup key that is small enough to not be considered a nuisance to carry in a wallet. For example, such a key may be useful to have as a backup for Phone-as-a-Key keyless entry systems. A difficulty in creating a usable mechanical key in the size of a credit card is that the mechanical key needs to be thicker than a credit card. This may be addressed by allowing the card to fold into the shape of a full-thickness mechanical key. This may alternatively be addressed by allowing the keycard to carry stacking key elements that may be combined to form a backup key.

Each of these possibilities solve the problem of a PaaK user carrying around a thick backup key to provide access to the vehicle in the event of a depleted vehicle or phone battery. However, in other, lower-severity use cases, both of those solutions create more work for the user. Since the user would always be carrying this—albeit thinner—card, it would be beneficial to provide additional convenient functionality to the user for other use cases, such as: (i) valet driver handoff device; (ii) user forgot keypad code; (iii) depleted phone battery or malfunctioning Bluetooth on phone or vehicle; (iv) user does not have phone with them, but does have wallet with backup card (could be short-term, such as user went to garage without phone, or could be long-term, such as user left phone at home); or (v) user locked phone inside car and is now outside.

As discussed in detail herein, electronics may be added to a backup card to allow access to vehicle functions. These electronics may include NFC, RFID, BLE and/or Ultra-Wideband (UWB) as well as a thin film battery.

The vehicle functions may include allowing for access to enter the vehicle by tapping the card on a specific location on the exterior of the vehicle. To do so, the vehicle may have a powered NFC or RFID reader on the outside of the vehicle. Responsive to detection of an authorized NFC/RFID device being tapped on the reader, the vehicle may be unlocked. This may be more convenient than entering a backup code via a vehicle keypad and does not require giving a valet or service person the backup code.

In another example, these functions may include an ability to start and drive-away the vehicle by tapping the card at a specific location on the interior of the vehicle. To do so, the vehicle may include a powered NFC/RFID reader in a location inside the vehicle cabin, such as near the steering wheel, in the center console, or in some other location. Responsive to detection of an authorized NFC/RFID device at this reader, the vehicle would be primed for a motive start. At that point, the user may press the brake pedal and push-to-start button to turn the vehicle on with drive-away capabilities. This may also allow a valet/service person to drive the vehicle without being given access to a backup code.

In yet another example, these functions may include fob-like functions, such as a vehicle locator function which may be activated by pressing a button on the keycard. Buttons on the surface of the card may allow the user to command different actions to the vehicle over BLE or UWB, such as vehicle finder, vehicle lock, vehicle unlock, remote start of the vehicle, and panic or alarm. These functions may also allow a valet/service person to quickly locate the vehicle. To save battery, the keycard may avoid BLE communication to the vehicle unless a button on the keycard is pressed. Responsive to the button being pressed, an advertisement packet may be sent to the vehicle with the associated data.

FIG. 1 illustrates an example 100 of a stackable key 102 including a plurality of stackable key sections 104. Each key section 104 includes a base 106 and a layer of a blade 108 of the key 102. The blade 108 refers to the shaft of the key 102 which is inserted into the lock. The base 106 is generally wider than the blade 108, and is used to hold and turn the key 102 when the blade 108 is inserted in a lock cylinder. The blade 108 of the key is the portion of the key 102 that holds the wards, bitting, and cuts, and that is inserted into the lock to make contact with the internal components of the lock. The key sections 104 may be stacked on top of one another to cause the layers of the blade 108 to align to form the key 102. As shown, the example key 102 includes three sections 104, labeled "A", "B", and "C". However, this is but one example, and more or fewer sections 104 may be used. For a wave cut key, three sections 104 of the key 102 may be used. Other types of keys, such as sawblade keys, may be created with only two sections 104 of the key 102.

To aid in alignment of the stackable key sections 104, connection points 110 along the sides of the sections 104 may be provided. In one example, on one section 104 a protrusion may be provided, which may fit into a corresponding recess on the next section 104. In another example, small magnets may be provided as connection points 110, placed within or on top of the sections 104 of the key 102 to secure the sections 104 together in the stacked state. The connections points 110 may be placed along the length of the mechanical key 102, at the base 106 (e.g., the handle region) or both.

The amount of torque needed to open a lock cylinder is on the order of one half to two Newton-meters (Nm). As the sections of the key 102 may be stacked before use, the key 102 may be manufactured in a thickness and/or in a material that may be unusable to open the lock in a single section 104, but is designed to be of acceptable strength once stacked. In one example, the key 102 may be composed of metal. In another example, the key 102 may be composed of plastic.

FIG. 2 illustrates an example 200 side view of the plurality of stackable key sections 104 of the stackable key 102 of FIG. 1 arranged in a stacked state. As shown, the key section 104 "A" is stacked above the key section 104 "B", which in turn is stacked above the key section 104 "C". As further shown, the key sections 104 are held into the stacked state via the connection points 110.

FIG. 3 illustrates an example 300 top view of the plurality of stackable key sections 104 of the stackable key 102 of FIG. 1 arranged in the stacked state. Similar to as shown, in the example 200, the key section 104 "A" is stacked above the key section 104 "B", which in turn is stacked above the key section 104 "C", with the sections 104 held into the stacked state via the connection points 110. When the key sections 104 are not in the stacked state, it would be desirable for the key sections 104 to be stored so that they are convenient to carry.

FIG. 4 illustrates an example 400 of a keycard 402 having a key holder 404 for the storage of the key sections 104 of the stackable key 102 and a section 408 for the storage of electronics configured to wirelessly provide access to a vehicle. As shown, the keycard 402 is generally rectangular, in a shape similar to that of a credit card. A credit card, as defined by the ISO/IEC 7810 ID-1 standard, may be 85.60 mm×53.98 mm (3⅜×2⅛ inches) in dimension, with rounded corners with a radius of 2.88-3.48 mm. By being the shape of a standard credit card, the keycard 402 may be readily carriable in a typical wallet. However, it should be understood that this is only one example, and keycards 402 of different dimension are contemplated.

The key holder 404 portion defines a series of sleeves 406, where each sleeve 406 is sized for holding a respective one of a plurality of key sections 104 of the key 102. The sleeves 406 may be made of a thin, flat material such as plastic sheeting, and may be attached to the keycard 402 to provide attached sides and openings at the edge of the keycard 402 in which the key sections 104 may be inserted blade 108 end first for storage. The key holder 404 as shown includes three sleeves 406, each for holding one of the key sections 104 of the stackable key 102. As the key sections 104 have a wider base 106 and a narrower blade 108, the openings of the sleeves 406 may alternate in direction (e.g., from top of the card to bottom of the card, to top of the card, etc.), to allow the bases 106 of the key sections 104 to more easily fit without overlapping one another.

The electronics section 408 of the keycard 402 includes circuitry configured to wirelessly provide access to a vehicle. In general, this circuitry may include one or more of NFC functionality 410, BLE functionality 412, or a battery 414. The vehicle may include a body controller in communication with a radio frequency (RF) transceiver of the vehicle and also with NFC sensors of the vehicle. The electronics section 408 of the keycard 402 may be in communication with the RF transceiver of the vehicle utilizing the BLE functionality 412 of the keycard 402 powered by a battery 414 of the keycard 402. The electronics section 408 of the keycard 402 may also be in communication with the NFC sensors of the vehicle using NFC functionality 410 of the keycard 402. In one example, the NFC sensors of the vehicle may include one or more sensors on the exterior of the vehicle which may be used in conjunction with the NFC functionality 410 of the keycard 402 to unlock or lock the vehicle using NFC. Additionally, or alternately, the NFC sensors may further include NFC sensors within the vehicle which may be used in conjunction with the NFC functionality 410 of the keycard 402 to start the vehicle.

As shown in the example 400, to promote thinness of the keycard 402, the electronics section 408 of the keycard 402 may be nonoverlapping with the key holder 404 portion of the keycard 402. This may allow for increased thinness, but at the expense of the size of area being dedicated to the electronics section 408. Accordingly, as a tradeoff, the electronics section 408 may allow for a smaller battery than might otherwise be possible with a larger electronics section 408.

FIG. 5 illustrates an example 500 of a keycard 402 that is foldable into a backup key and that includes a section 408 for the storage of electronics configured to wirelessly provide access to the vehicle. Similar to the keycard of the example 400, the keycard 402 of the example 500 includes stackable key sections 104, where each of the sections 104 includes a base 106 and a layer of a blade 108 of the key. Also similar, to aid in maintaining alignment of the stackable key sections 104, the connection points 110 along the sides of the sections 104 may be provided.

However, rather than the sections 104 being separate elements, in the example 500 the backup foldable keycard 402 may be configured to fold along hinges 502 to cause the layers of the blade 108 to align to form the key. The keycard 402 may also be unfolded along the hinges 502 and stored flat and thin as a collective flat surface. Such a keycard 402 may be created to be about the size of a credit card. For a wave cut key, two hinges 502 for three sections 104 of the key may be used. Other types of keys, such as sawblade keys, may be created with only a single hinge 502 and two sections 104 (not illustrated).

As shown, the foldable keycard 402 is foldable in a longitudinal orientation. Using the longitudinal side may be advantageous in keys with a blade 108 length less than the card width. This also provides an electronics section 408 on the keycard 402 that extends from the base 106 of one of the sections 104 and that could be used to place other components, such as passive or active wireless electronics. This electronics section 408 may be configured to be folded back from the blades 108 with an additional hinge 504. This may allow the electronics section 408 to fold out of the way to allow the complete blade 108 of the keycard 402 to be inserted into a lock cylinder.

Notably, as compared to the keycard 402 in the example 400, the keycard in the example 500 may have a smaller electronics section 408. Therefore, the foldable keycard 402 as shown may be able to store a smaller NFC 410, BLE 412, and/or battery 414 components as compared to the keycard 402 of the example 400.

Figure 6:
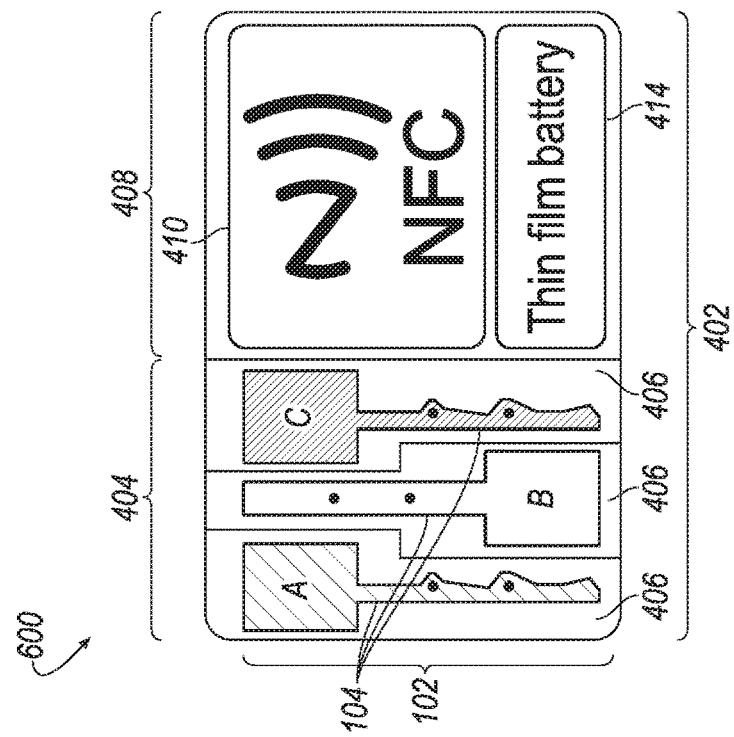
FIG. 6 illustrates an example variation of the keycard of FIG. 4 having a vehicle access electronics section supporting only NFC but not BLE.

FIG. 6 illustrates an example 600 variation of the keycard 402 of FIG. 1 having an electronics section 408 supporting only NFC but not BLE. As shown, in this variation the BLE 412 is excluded, providing greater area for the NFC 410 and battery 414 components. For best performance, an NFC antenna smaller than a full credit card requires a power source for active load modulation. Accordingly, larger NFC 410 and battery 414 components would be beneficial.

Figure 7:
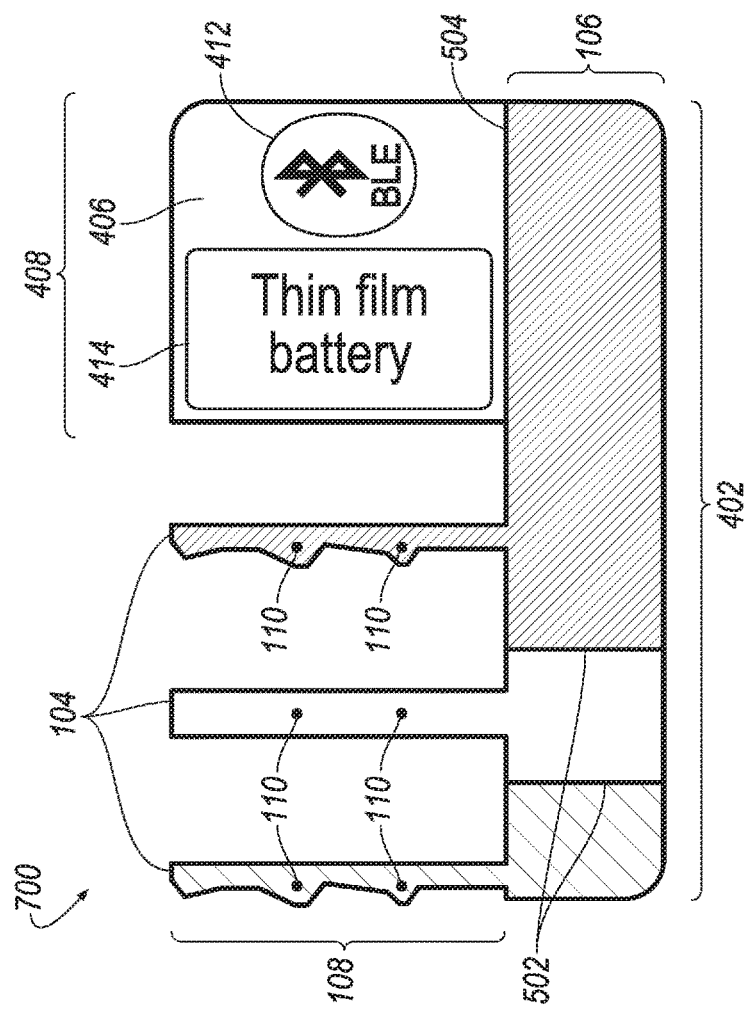
FIG. 7 illustrates an example variation of the keycard of FIG. 5 having a vehicle access electronics section supporting only NFC but not BLE.

FIG. 7 illustrates an example 700 variation of the keycard 402 of FIG. 2 having a n electronics section 408 supporting only NFC but not BLE. As shown, in this variation, as well, the BLE 412 is excluded, providing greater area for the NFC 410 and battery 414 components.

Figure 8:
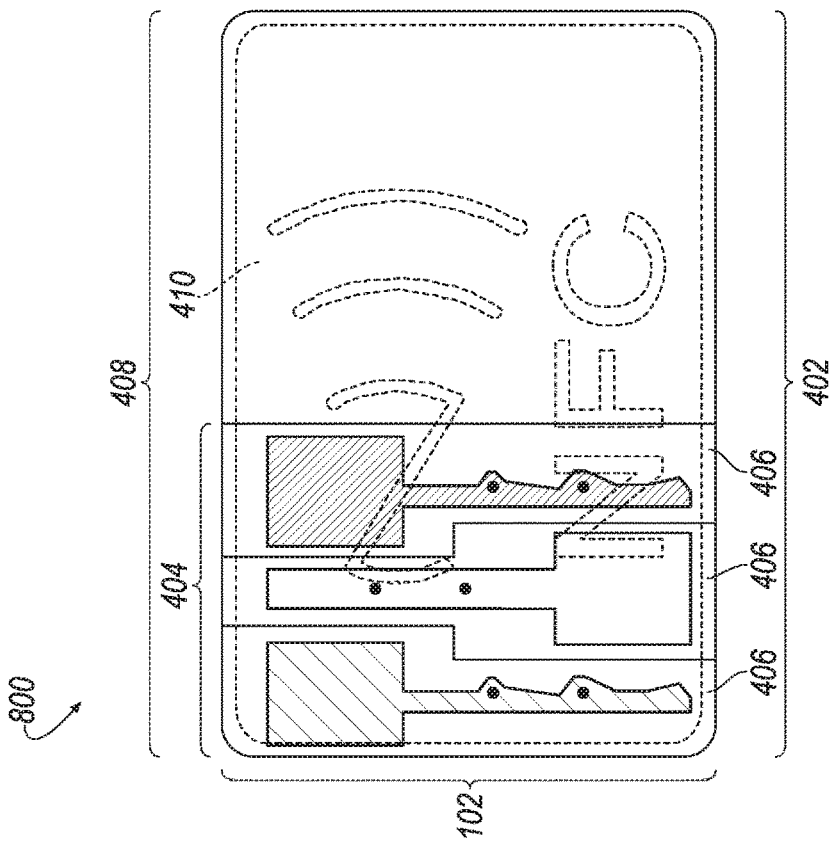
FIG. 8 illustrates an example variation of the keycard of FIG. 4 having a vehicle access electronics section supporting NFC below the sleeve sections.

FIG. 8 illustrates an example 800 variation of the keycard 402 of FIG. 1 having an electronics section 408 supporting NFC below the sleeves 406. As shown, in this variation thinness of the card is exchanged for greater surface area for the NFC 410 components. This may result in a thicker keycard 402 as compared to the keycard 402 shown in FIG. 1, but one with more reliable NFC 410 functionality. As the components include NFC 410 only, there is no active load modulation needed. However, this approach does require the NFC antenna to sit under the key layers which may add thickness, and does not work for a folding-type keycard 402.

Figure 9:
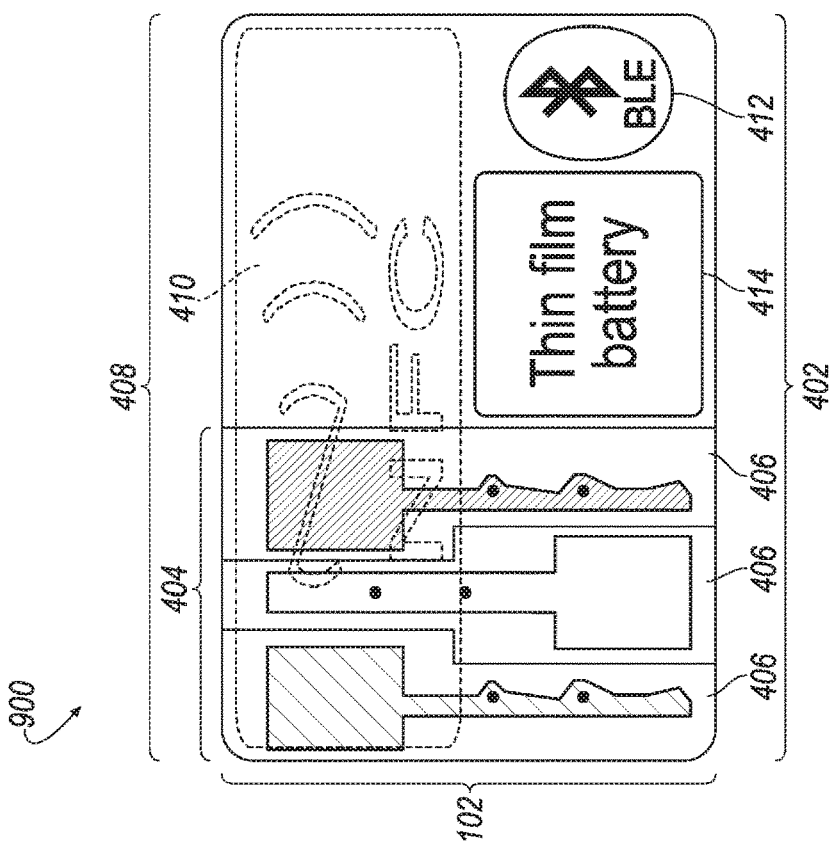
FIG. 9 illustrates an example variation of the keycard of FIG. 4 having a vehicle access electronics section supporting NFC and BLE below the sleeve sections.

FIG. 9 illustrates an example 900 variation of the keycard 402 of FIG. 1 having an electronics section 408 supporting NFC and BLE below the sleeves 406. As shown, in this variation thinness of the card is exchanged for greater surface area for the electronic components. This may again result in a thicker keycard 402 as compared to the keycard 402 shown in FIG. 1, but one with longer battery life and/or more reliable range of the NFC functionality.

It is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A foldable keycard, comprising:
   first and second sections, each defining a base and a layer of a blade of a key extending therefrom;
   a hinge connecting the bases of the first and second sections, wherein the first section is configured to fold over the second section about the hinge so that a top surface of the first section is against a bottom surface of the second section and each of the layers of the blades align to form the blade of the key, and the first and second sections are configured to fold about the hinge into a storage position to form a collective flat surface; and
   an electronic vehicle access component arranged at the base of one of the sections opposite the blades, and configured to fold away from the blades to allow the keycard to be inserted into a lock.

2. The foldable keycard of claim 1, wherein the electronic vehicle access component includes a battery and one or more of a BLUETOOTH Low Energy (BLE) transceiver powered by the battery or an Ultra-Wideband (UWB) transceiver powered by the battery.

3. The foldable keycard of claim 1, wherein the electronic vehicle access component includes a passive near-field communication transmitter.

4. The foldable keycard of claim 1, wherein the electronic vehicle access component includes a battery and an active near-field communication transmitter powered by the battery.

5. The foldable keycard of claim 1, wherein the electronic vehicle access component includes, a battery, a BLUETOOTH Low Energy (BLE) transceiver powered by the battery, and a near-field communication transmitter.

6. The foldable keycard of claim 1, wherein the electronic vehicle access component includes a battery.

7. The foldable keycard of claim 1, wherein the first section includes one or more protrusions configured to fit into corresponding recesses of the second section to secure the first and second sections together when folded.

8. The foldable keycard of claim 1, wherein the first section includes one or more magnets configured to attach to corresponding magnets on the second section to secure the sections together when folded.

9. The foldable keycard of claim 1, further comprising:
   a third section, also defining a base and a layer of the blade of the key extending therefrom; and
   a second hinge connecting the bases of the second and third second sections, wherein the second section is configured to fold over the third section about the second hinge so that a top surface of the second section is against a bottom surface of the third section to further form the blade of the key, and the second and third sections are configured to fold about the hinge into the storage position to further form the collective flat surface.

* * * * *